(12) United States Patent
Oggioni et al.

(10) Patent No.: US 8,938,627 B2
(45) Date of Patent: Jan. 20, 2015

(54) MULTILAYER SECURING STRUCTURE AND METHOD THEREOF FOR THE PROTECTION OF CRYPTOGRAPHIC KEYS AND CODE

(75) Inventors: Stefano S. Oggioni, Besana in Brianza (IT); Vincenzo Condorelli, Poughkeepsie, NY (US); Claudius Feger, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/382,814

(22) PCT Filed: Apr. 13, 2010

(86) PCT No.: PCT/EP2010/054782
§ 371 (c)(1),
(2), (4) Date: Jan. 6, 2012

(87) PCT Pub. No.: WO2011/003636
PCT Pub. Date: Jan. 13, 2011

(65) Prior Publication Data
US 2012/0117666 A1      May 10, 2012

(30) Foreign Application Priority Data
Jul. 7, 2009   (EP) ..................................... 09164732

(51) Int. Cl.
*G06F 21/00*      (2013.01)
*G06F 21/87*      (2013.01)

(52) U.S. Cl.
CPC ........ *G06F 21/87* (2013.01); *G06F 2221/2107* (2013.01); *G06F 2221/2131* (2013.01); *Y10S 257/922* (2013.01)

USPC .......................................... 713/194; 257/922

(58) Field of Classification Search
None
See application file for complete search history.

(56) References Cited

U.S. PATENT DOCUMENTS

| 5,406,630 A | 4/1995 | Piosenka et al. |
| 6,901,343 B2 * | 5/2005 | Takahashi et al. ............ 702/119 |

(Continued)

FOREIGN PATENT DOCUMENTS

| CN | 1897787 A | 1/2007 |
| CN | 101258552 A | 9/2008 |

(Continued)

OTHER PUBLICATIONS

English language Abstract EP1746872, Retrieved on Jan. 24, 2007.
(Continued)

*Primary Examiner* — Minh Dinh
(74) *Attorney, Agent, or Firm* — Scully, Scott, Murphy & Presser, P.C.

(57) ABSTRACT

An arrangement for the protection of cryptographic keys and codes from being compromised by external tampering, wherein the arrangement is utilized within a multilayered securing structure. More particularly, there is provided a multilayered securing structure for the protection of cryptographic keys and codes, which may be subject to potential tampering when employed in computers and/or telecommunication systems. A method is provided for producing such multilayered securing structures within a modular substrate with the intent to protect cryptographic keys and codes which are employed in computers and/or telecommunication systems from the dangers of potential tampering or unauthorized access.

13 Claims, 10 Drawing Sheets

(56) References Cited

U.S. PATENT DOCUMENTS

| | | | |
|---|---|---|---|
| 7,418,603 B2 | 8/2008 | Nakayama et al. | |
| 7,549,064 B2 * | 6/2009 | Elbert et al. | 713/194 |
| 7,788,801 B2 * | 9/2010 | Oggioni et al. | 29/852 |
| 8,074,082 B2 * | 12/2011 | Ozguz et al. | 713/194 |
| 8,143,705 B2 * | 3/2012 | Van Geloven et al. | 257/621 |
| 2006/0201701 A1 | 9/2006 | Coleman et al. | |
| 2006/0231633 A1 | 10/2006 | Farooq et al. | |
| 2007/0018334 A1 | 1/2007 | Peytavy et al. | |
| 2007/0038865 A1 | 2/2007 | Oggioni et al. | |
| 2007/0177363 A1 | 8/2007 | Jayanetti | |
| 2008/0036598 A1 | 2/2008 | Oggioni | |

FOREIGN PATENT DOCUMENTS

| | | |
|---|---|---|
| CN | 100501992 C | 6/2009 |
| EP | 1 676 182 | 7/2006 |
| EP | 1746872 | 1/2007 |
| EP | 1804559 | 7/2007 |
| FR | 2 888 975 | 1/2007 |
| JP | 2000076140 | 3/2000 |
| JP | 2005136391 | 5/2005 |
| JP | 2006344862 | 12/2006 |
| JP | 2009540585 | 11/2009 |
| JP | 2011086034 | 4/2011 |
| WO | WO 2007019642 | 2/2007 |
| WO | WO2007144026 | 12/2007 |

OTHER PUBLICATIONS

English language Abstract EP1804559, Retrieved on Jul. 4, 2007.
International Search Report from International application No. PCT/EP2010/054782, Mailed on Jan. 10, 2010.

* cited by examiner

MULTILAYER SECURING STRUCTURE AND METHOD THEREOF FOR THE PROTECTION OF CRYPTOGRAPHIC KEYS AND CODE

CROSS-REFERENCE TO RELATED APPLICATIONS

The present invention relates to and claims the benefit of the filing date of commonly-owned, co-pending PCT Patent Application No. PCT/EP2010/054782, filed Apr. 13, 2010, which further claims the benefit of priority date of commonly-owned, co-pending European European Patent Application No. EP 09164732.1, filed on Jul. 7, 2009, the entire contents and disclosure of which is incorporated by reference as if fully set forth herein.

FIELD OF THE INVENTION

The present invention relates to an arrangement for the protection of cryptographic keys and codes from being compromised by external tampering, wherein the arrangement is utilized within a multilayered securing structure. More particularly, the invention pertains to a multilayered securing structure for the protection of cryptographic keys and codes, which may be subject to potential tampering when employed in computers and/or telecommunication systems. The invention further discloses a method for producing such multilayered securing structures within a modular substrate with the intent to protect cryptographic keys and codes which are employed in computers and/or telecommunication systems from the dangers of potential tampering or unauthorized access.

BACKGROUND OF THE INVENTION

Pursuant to the current state of the technology, electronic packages which are employed or intended for use in applications that are to be certified pursuant to the United States Federal Information Processing Standards (FIPS PUB 140-2) which are published by the National Institute of Standards and Technology (NIST), the Department of Commerce has classified all of the information contained therein into essentially four increasingly stringent qualitative levels of security; which, in effect, for purposes of uniformity and standardization are designated as respectively, Level 1 through Level 4. These security levels are normally intended to extend over and resultingly cover a wide range of potential applications and diverse environments in which there may be or are currently employed various cryptographic modules which must be adequately protected so as to be secure from any tampering and/or unauthorized access to the information which is supplied to and contained in the respective modules.

In order to attain an adequate degree of protection against any potential tampering with the internal cryptographic keys and codes that are contained in computers and/or telecommunication systems, for instance, such as telephones or the like, it is intended to attain the implementing of at least a Level 4 electronic cryptographic protection, wherein the scope of protection must be imbued with important functions and attributes beyond that of a classical or, in effect, a so-called normal or basic degree of mechanical protection for the electronic packages that contain semiconductor devices. Ultimately, the electronic packages must be capable of maintaining the security from tampering with or unauthorized access to the cryptographic keys and algorithms which are stored within the modules containing the semiconductor devices, and wherein the functions and capabilities of the tamperproof arrangements or layers reside in avoiding or inhibiting any penetration thereof by unauthorized microprobes which would enable information to be retrieved and read from the exterior of the secure boundaries or confines of the module.

Hereby, to be able to achieve satisfactory levels of protection for electronic packages against any tampering therewith emanating from unauthorized external sources which, conceivably, could potentially compromise electronic cryptographic keys and codes contained therein, a basic concept resides in creating a succession of superimposed or stacked-through combination of layers enabling the application of different techniques, and that possess physical properties which facilitate the detection, preferably by the employment of an electronic monitoring system, of any attempts at tampering, whereby a sensing or detection of the tampering attempts will enable a security system to disable the module by clearing therefrom all sensitive information stored in a volatile memory which is contained therein.

From the standpoint of providing the necessary security, the tamper attempts are generally able to be detected when circuits contained in the module change their electrical properties from a previously calibrated and characterized level. Protection layers which are employed in the module are capable of preventing the creation of holes, such as are intended to introduce unauthorized electrical microprobes that are produced through several different techniques, for instance, by micro-drilling with ceramic drills, selective layer ablation, or the use of lasers. Moreover, the circuits are also difficult to work with due to their intrinsic fragility when tampered with, in effect, having a very low thickness, comprising brittle layers, and not being solderable, so as to prevent any shunting of the electrical circuit. In order to preserve the service life of employed battery back-ups, these circuits are preferably constituted of highly resistive conductive materials that draw a low electrical current, in contrast with the utilization of low-ohmic conductive lines.

The engineering of such a module can result in being able to devise solutions in which various manufacturing steps can be technologically updated to include features that, from a standpoint of providing an adequate level of security, are relevant in meeting specific anti-tampering or tamper-resistant requirements. The definition of a secure module, in effect, the structure of the implemented modular layers, resides in taking advantage of different possible combinations in the stacking of these layers so as to meet different criteria in attaining levels of security for more broad-based and generic commercial applications beyond those set forth by current FIPS requirements and standards.

The present invention is intended to replace a current temper-resistant security product that is basically difficult to manufacture, and resultingly is very expensive in nature.

For example, the present technology uses a PCB card (full card) that is positioned between a pair of Cu covers which are then riveted together so as to form a box. Thereafter, the resultant package with the two Cu covers is wrapped with a polymer film which, on the two opposite sides thereof has a pattern imprinted with a carbon ink defining a resistive network. Once the film encompasses the Cu box, the package is then placed into an aluminum box which is open on one side thereof, and the entire assembly is then potted with a resin in order to form a brick. Extending from the newly formed brick is only a flat cable in order to establish an external electrical connection with the electronics of the system contained therein.

False or erroneous calls encountered during manufacturing operations and in the field, pursuant to current solutions are the identified limit of the ascertained problems due to tampering attempts, whereby erasing of the cryptographic code drives the replacement of the units or packages at customer sites. Similarly, major impacts encountered on the manufacturing floor have been identified during assembly operations with an erroneous fall-out or failure that is only detected at test stations.

Described hereinbelow is a brief description of some of the limiting factors that are experienced in the detection of the problems as are presently encountered in the technology.

(A) a bowing or similar deformation of the electronic package (once potted) due to the expansion of air and moisture which is entrapped within the package (PCB card and Cu box), that causes the formation of tears and breaks (i.e., discontinuities or ruptures) in the imprinted ink network of the envelope which is added externally at the overall assembly of the part;

(B) bubbles of air or moisture that are formed during potting may also be responsible for similar defects that are encountered in the electronic packages;

(C) the wrapping of the polymer film about the copper covers may also cause defects in the corners of the package wrapping, such as a pinching of the polymer and breaking or rupture of the envelope imprinted resistive network thereon; and (D) the exiting cable, which is normally connected to the polymer resistive matrix with an electrically conductive adhesive, may evidence temperatures, dependencies and susceptibility to impermissible manufactured batch-to-batch performance changes resulting in an adverse reliability.

SUMMARY OF THE INVENTION

Accordingly, pursuant to the present invention, in order to improve upon the foregoing protective measures against tampering and/or unauthorized access to the information in electronic packages, which are presently employed in the technology, and in order to obtain a higher degree of reliability while attaining reduced costs during the manufacture of the electronic packages, there are employed conductive materials which are undetectable by means of X-ray inspection or by the application of acoustic microscopy, and which are embedded in a predetermined random pattern in the module (i.e., the printed circuit board, or stacked laminate structure) of the electronic package.

In essence, the invention provides for a tamperproof electronic package or module structure through the utilization of unique electrically arranged so-called 3D (Three Dimensional) or interlayer connections in order to attain the highest possible degree of reliability in precluding the fait accompli or potential success of any tampering or unauthorized access attempts.

The foregoing inventive concept facilitates the attaining of a superior construction and method of manufacture in comparison with the state-of-the-art, allowing for the testing of separate sections of the electronic package or module structure prior to committing the entire assembly to a critical function that is directed to protecting any cryptographic or secret code from being compromised. By definition, this section upon being activated reads all events, which are encountered beyond a certain level as being directed to a tampering attempt to break-in, and resultingly clears the code, this also being the case in normal manufacturing process variations.

A primary technological aspect of the invention resides in the possibility of being able to build a stack of layers, of which some layers may incorporate secure network circuits, and to have these interconnected in a manner rendering any tampering attempts to be extremely difficult and unreliable to execute. A rendering of possible tampering methods or attempts unreliable is proposed by the invention through the utilization of materials which are normally difficult to work with. In essence, these materials may be of a nature of not being solderable, or so thin as to be impracticable to cause a minimal diffusion of the material into other materials, such as may be encountered during soldering operations. The concept of seeking protection against tampering through applying the invention resides also in the use of methods adapted to achieve a layer-to-layer interconnection (in the Z-direction) using very small structures incorporating laser-drilled holes, which are filled with electrically conductive pastes possessing various and diverse formulations, which interface with specific portions of a security circuit through the imposition of a standard PCB type of etching process.

The foregoing types of circuits are usually available in industry for other kinds of applications, such as for creating embedded resistive components within stacked layers of a printed circuit board. The difference of the prior art relative to the inventive method for providing the security circuit, resides in that the connection is extended to a highly complex matrix of networks, and that there is no provision of any copper pads which would either identify or limit the positioning of these circuit network structures.

The positioning of these network structures can be highly arbitrary or flexible, and with the assistance of geometric limits, such as are defined by manufacturing criteria, is implemented whereby it is not possible to identify the locations of these circuit connections, while enabling generating multiple layers of stackable layers or groups of layers, creating subassemblies that can be customized and positioned, and by means of standard PCB production processes incorporated into electronic package applications. These network structures forming sub-assemblies of the electronic packages can be used for applications that cover entire surfaces, or simply partial areas or segments thereof.

The same concept as mentioned hereinabove can be applied to flexible substrates, for example, such as are comprised of polyimide, i.e., Kapton (reg. TM) from Du Pont, liquid crystal polymers (LCP), Benzo Cyclo Butene (BCB), polyester, or the like. Moreover, these can be provided in a form which combines a plurality of substructures into multilayered combinations adapted to protect devices in the three dimensions due to the intrinsic flexibility of the substrates.

Accordingly, it is an object of the invention to impart protection against tampering by inhibiting unauthorized access to the contents of a tamperproof structure consisting of multilayers, wherein such contents include internally stored cryptographic keys and codes.

Another object resides in the provision of either metal oxide, and/or metal alloys, intermetallics compounds high resistive layers or inks, wherein designs in circuitry that is to be protected from tampering are provided in highly unpredictable or random patterns which are impossible to detect through normal detection techniques such as X-rays, optical or acoustic microscopy, and wherein the protective or securing structures are arranged in at least one or more layers within the overall multiple-layered structure of an electronic package.

Another provision of the present disclosure is that the network structure protecting the accessibility of security and cryptographic codes is an integral part of the design of the product. The same offers unmatched flexibility in the definition and partitioning as well as the design specific implementation of the secure areas. The solutions is built within the product and not added to it at a second time, there is no physical way to possibly detach or separate the same from the structural construction of the product itself. The proposed embodiments are fully compatible and can be co-existing with the regular construction elements of a normal PCB. The secure fence is masked within the same structural element which defines the product electrical connections which furthermore makes its identification mere complex.

BRIEF DESCRIPTION OF THE DRAWINGS

Reference may now be made to the following detailed description of exemplary embodiments of the invention, taken in conjunction with the accompanying drawings; in which.

DETAILED DESCRIPTION OF THE INVENTION

Figure 1A:
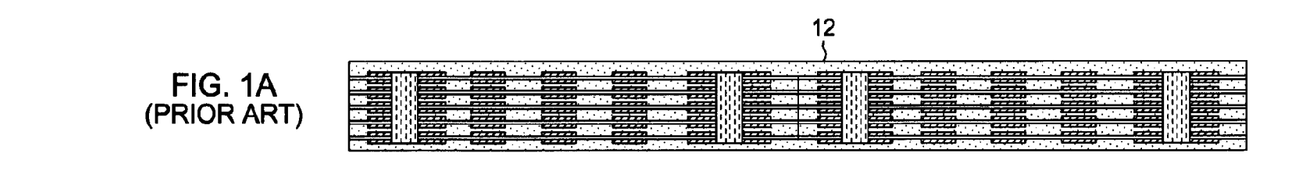
FIGS. 1A through 1C illustrate, respectively and diagrammatically, steps in the formation of present cryptographic tamper-proofing approach.
Figure 1B:
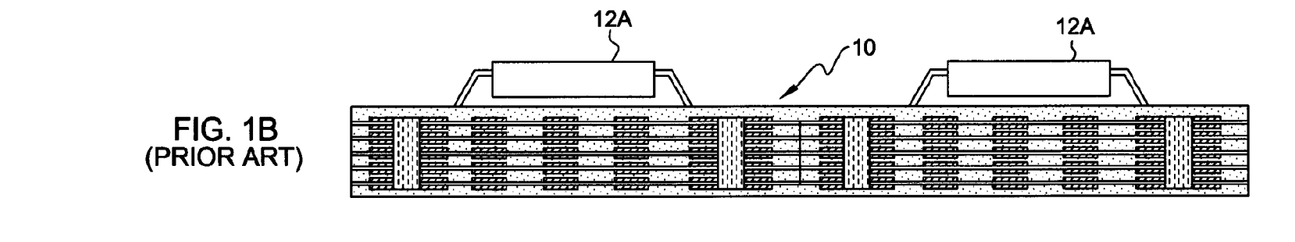
Figure 1C:
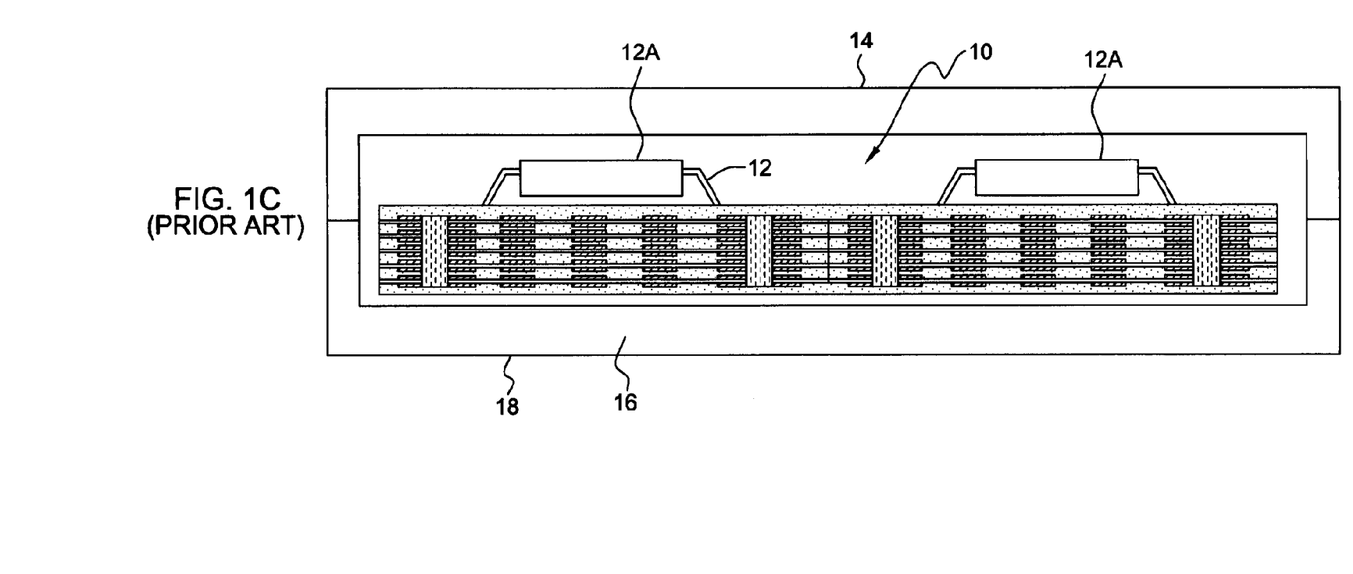

Referring to FIGS. 1A through 1C, there is illustrated an electronic package structure 10 utilizing at least one printed circuit card 12 and electronic component 12A, which is arranged between a pair of copper shells or covers 14, 16, which may be riveted together, as in the prior art.

The entire electronic package 10 with two copper shells or covers 14, 16 is wrapped about with a polymer film 18, that on both surfaces thereof is imprinted with a pattern of carbon inks (not shown) defining a resistive network. The entire electronic package is then placed in an aluminum box that is formed open on one side, which is then potted with a urethane resin and then a cover closed thereover. The foregoing structure is subject, at times, to false steps during manufacturing operations, and which may result in the erasing of cryptographic codes that are incorporated into the printed circuit board or card 12.

Figure 2A:
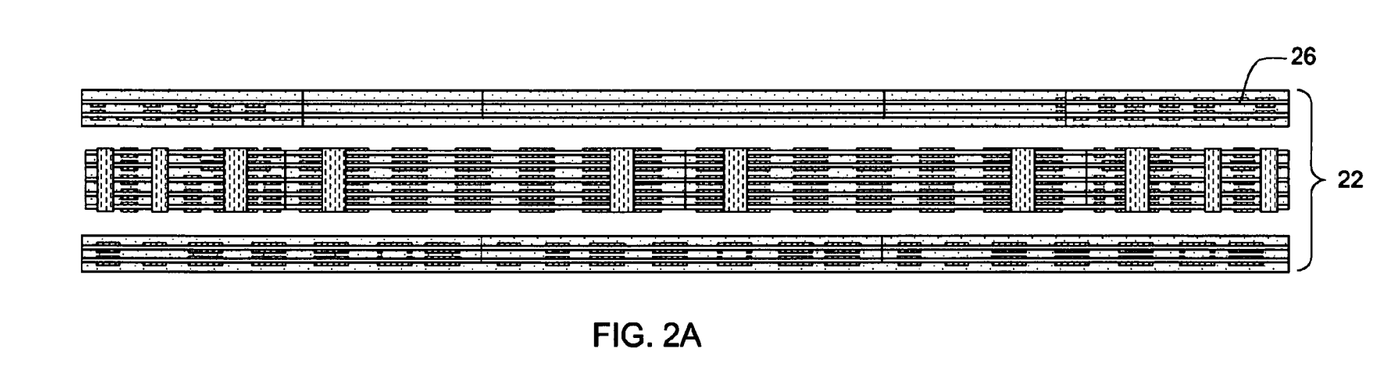
FIGS. 2A through 2D illustrate successive steps in producing the inventive package tamper-proof structures.
Figure 2B:
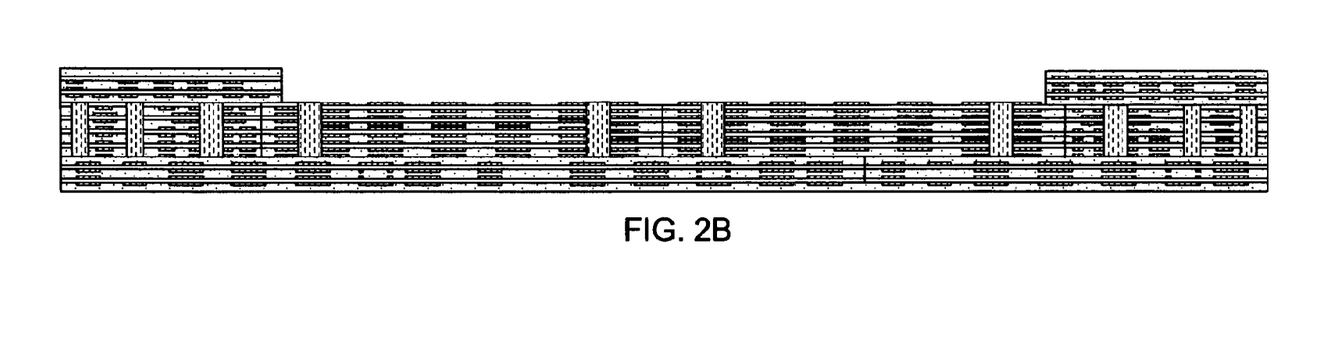
Figure 2C:
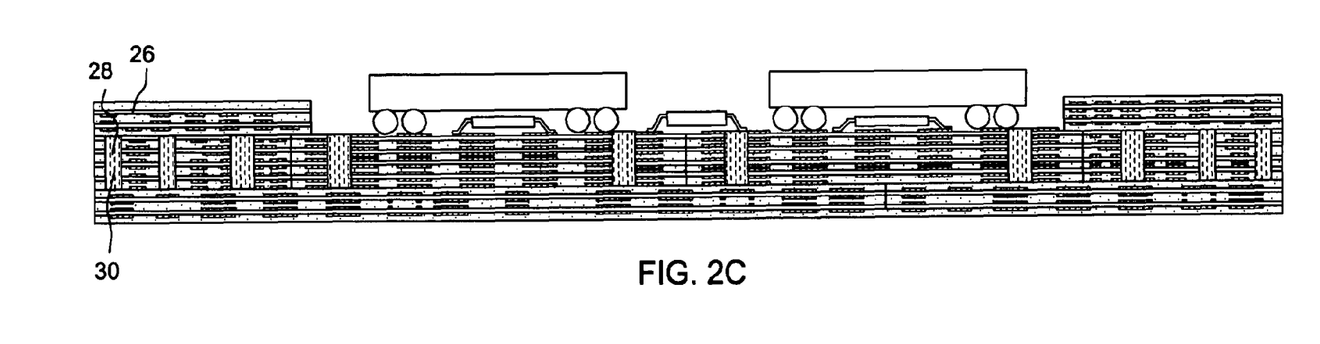
Figure 2D:
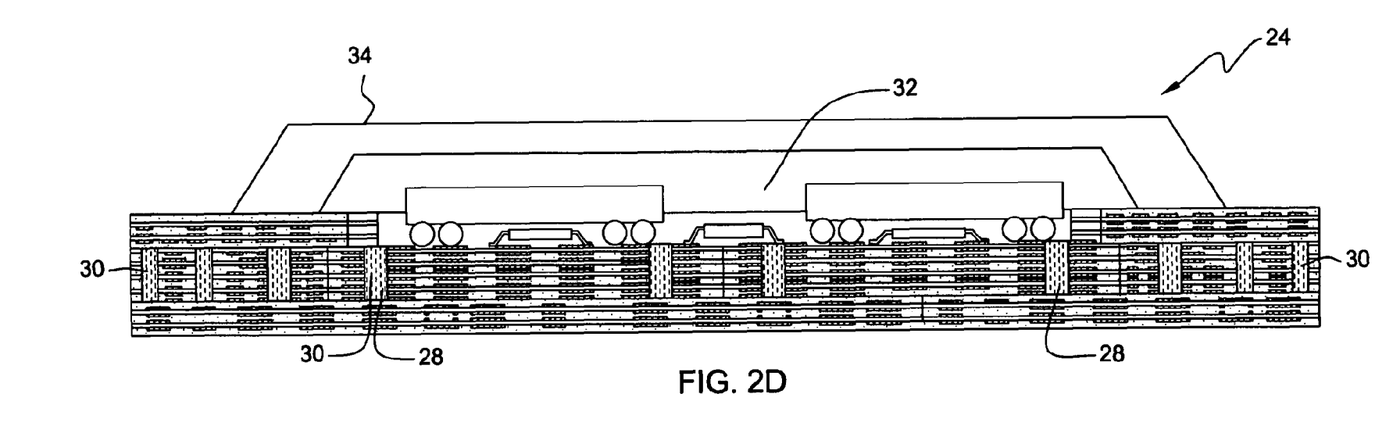

Pursuant to an embodiment of the present invention, as illustrated in FIGS. 2A through 2D, a multilayered structure 22 of an electronic package 24 incorporates layers or films 26 of NiP (nickel phosphorous) or NiCr (nickel cromium) of 0.01 μm to 0.4 μm thickness as a result of deposition (i.e. electroplating, sputtering, other methods) on copper foils which are then used to be laminated onto dielectric foils. The combination of copper foils treated with resistive materials, i.e. a deposited layer of a high resistance material such as NiP, laminated onto dielectric sheets makes the composite materials called pre-pregs used to build PCBs. The newly formed material can be processed as a regular copper-foil in the manufacture of multilayer Printed Circuit board stacks and the embodiment uses the copper layers covering the resistive material as an etching-mask to create patterns of resistive material. This is achieved by using selective etchants which are selectively removing, based on the process step considered in the analysis, alternatively the resistive material or the copper. At the end of the manufacturing process a panel should present all secure patterns made only of high resistive material with or without copper terminations. Furthermore, a plurality of suitable apertures 28 through the layers may also be provided at random locations filled with non solderable, electrically conductive material, 30, i.e., in each of said apertures, these materials may have as one of their constituents particles of NiP (nickel phosphorous), Nickel Cromium (NiCr), Copper, Silver, Nickel, Gold, Aluminum, Palladium, and/or other metal alloys or intermetallics particles, so as to inhibit any unauthorized tampering or access to the interior, since the NiP is impervious to X-rays, whereas any damage to the apertures containing NiP contacting circuitry with cryptographic information within the structure 22 will destroy or erase the latter. The electronic package, as indicated in FIG. 2D is potted within space 32 and covered with a suitable lid 34. These openings can be very small and connecting a plurality of layers or simply interconnecting two facing circuit layers without disruption of the surface continuity of the same (no holes).

Figure 3:
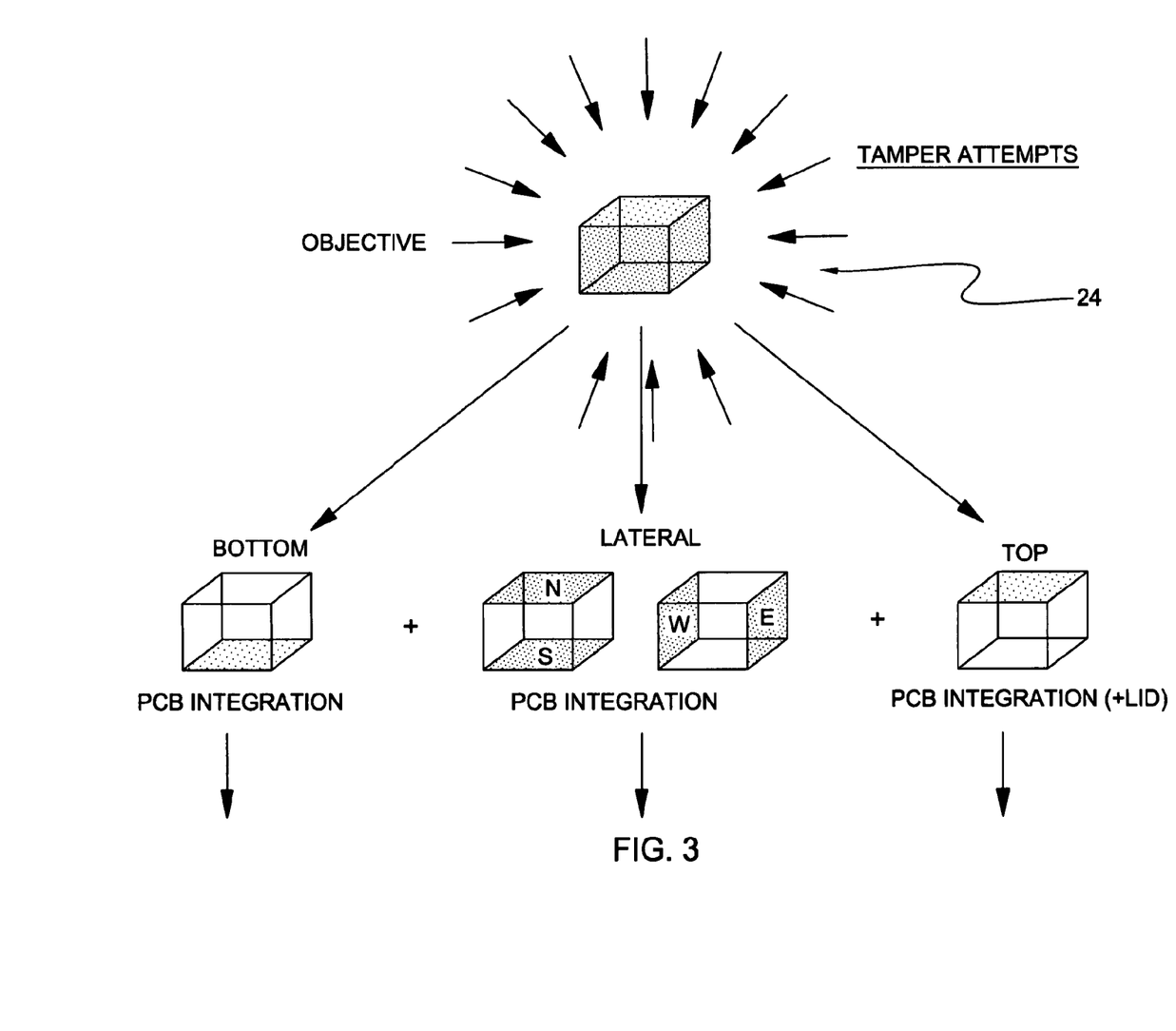
FIG. 3 illustrates, diagrammatically, tamper attempts which may be utilized in attempting to gain unauthorized access to stored cryptographic material.

As illustrated in the graphical representation of FIG. 3 of the drawings, this indicates various tamper attempts from different types of directions against the electronic package 24, such as with bottom PCB integration, lateral and PCB integration, and top PCB integration, including attempted penetration of the package lid.

Figure 4:
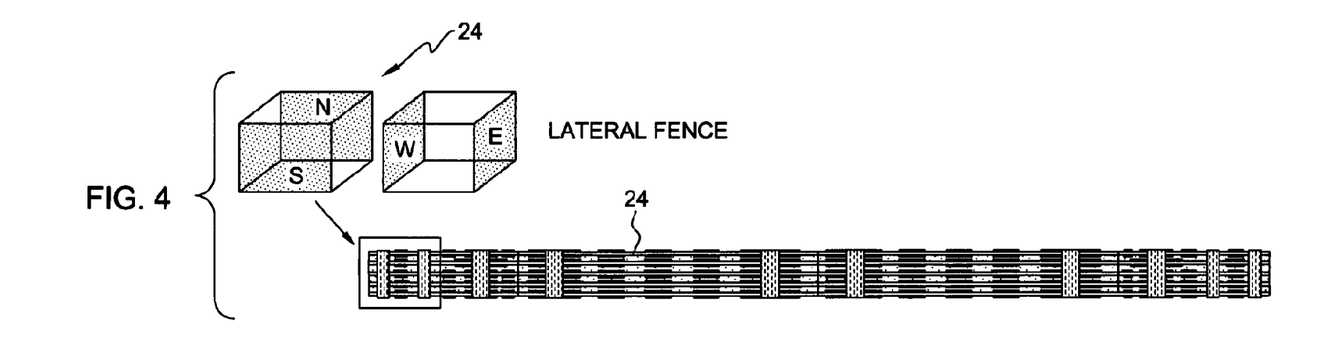
FIG. 4 and enlarged detailed FIG. 5 illustrate a new package concept for protecting by means of a lateral fence against a tamper attempt.
Figure 5:
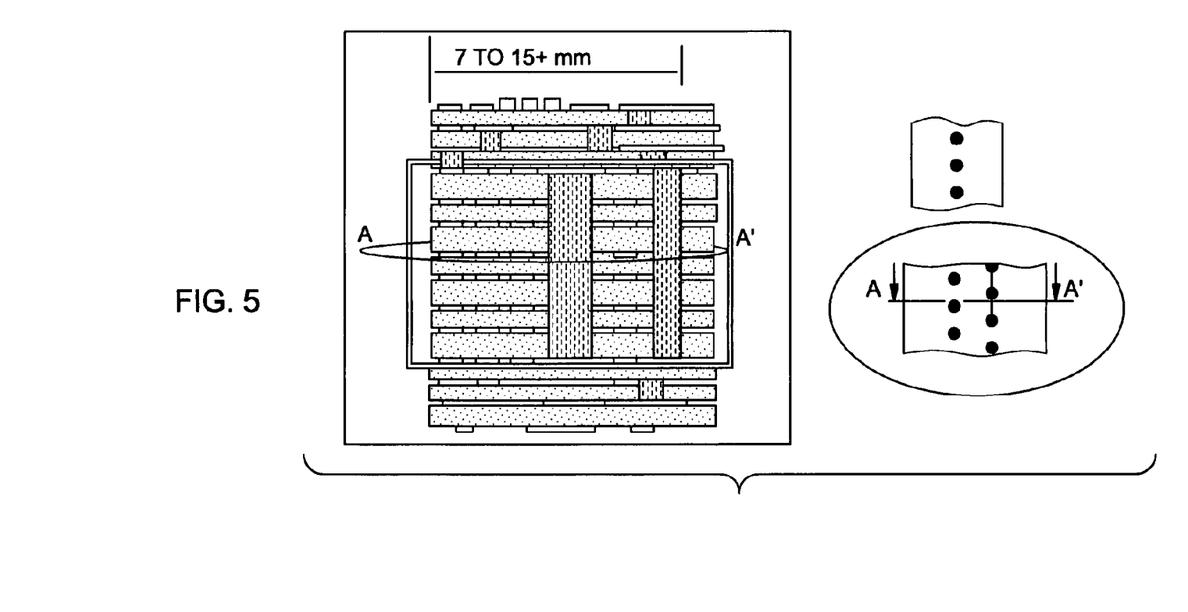
Figure 6:
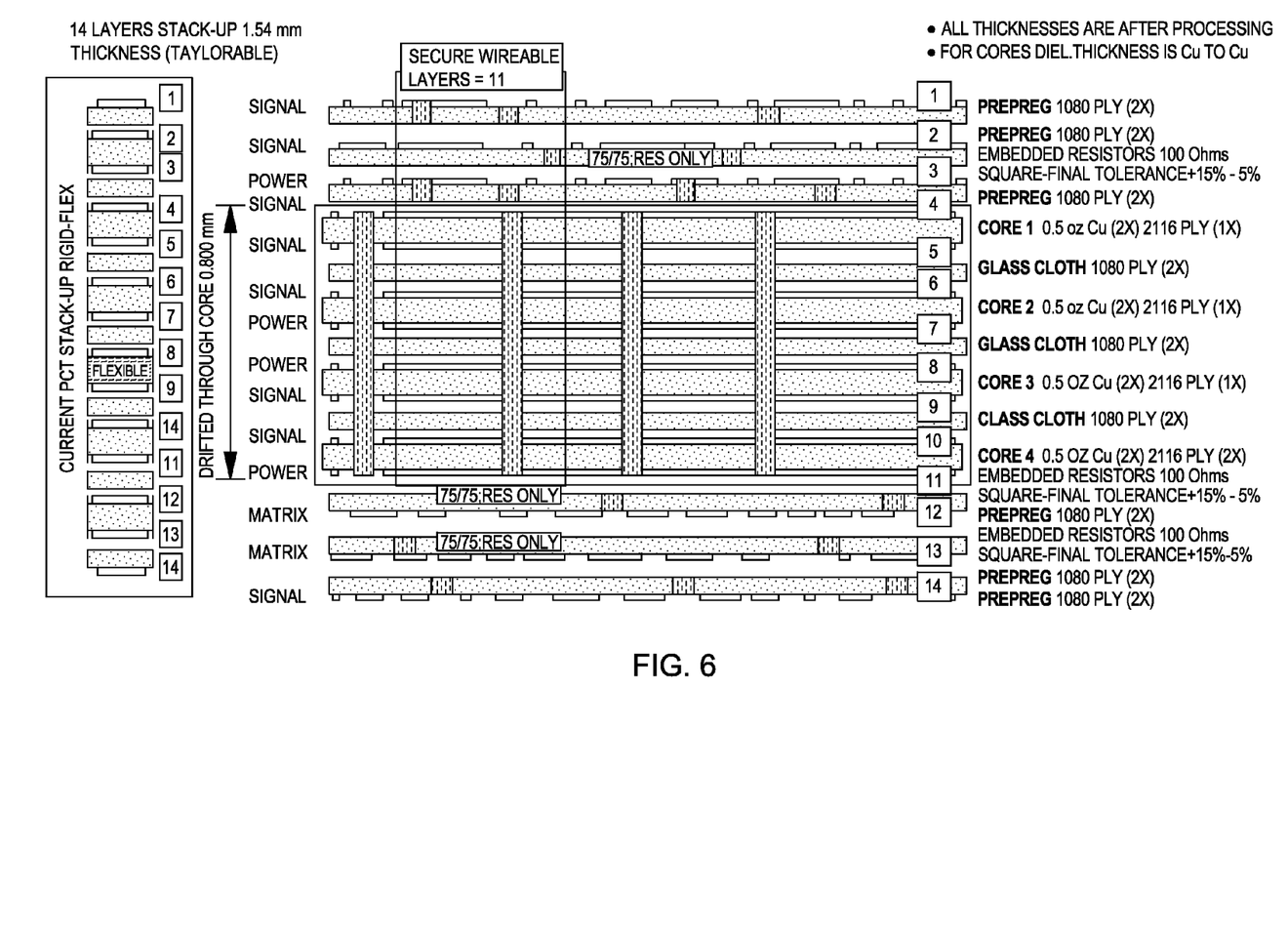
FIG. 6 illustrates an enlarged schematic detail of securable wireable layers of an electronic package module.

The base resistive materials as well as the other electrically conductive materials provided some of the essential building blocks available from the industry but these were not developed beyond their intended original use, as the resistive material between 2 resistor's copper electrodes, and definitively not to the extent defined into the embodiments illustrated in the present disclosure such as: a) the definition and construction of fully bi-dimensional and planar structures placed and mixed with circuits onto PCB planes and protecting areas/portions of circuit layers, b) the definition of vertical conductive paths, undetectable, by conventional methods, which is furthermore enhanced into an integrated vertical fence which coexists with conventional PCB vertical structures, c) achieving the completion of a three dimensional randomly interconnected structures creating the secure package. The new package concept providing anti-tampering protection is more clearly specifically described with reference to FIGS. 4 and 5 of the drawings. In that instance, utilizing the tamper protection against the lateral fence PCB integration tamper attempts, as shown in FIG. 4 of the drawings, and as also represented in the enlarged structure of the multilayer printed circuit board, the interior layers incorporate various arrays of apertures in a concept of employing random locations so as to foil any attempt at tampering and determining locations as to secret circuits by an outside source/tamperer. This feature may also be incorporated in various secure wireable layers, as indicated in further detail in FIG. 6 of the drawings, showing the multilayer electronic package structure and material aspects, by way of example, incorporating films of NiP (or NiCr) patterned by specific photo-etching processes into specific circuit configurations. In connection with the foregoing, the indicated dimensions are given by way of example, and are not limiting in any manner In principle, the present structure is also compatible to sequentially added Build Up Layer (BUL), with the use of a conductive ink in lieu of the NiP or NiCr resistive material. In this instance, and not exclusively for BUL structures, wherein layers are added sequentially, each of the multilayers provides differing aspects in affording tamper-proofing by selective materials being employed for the individual stacked layers in the module of the electronic package arrangement, such embodiment makes any developed technique to circumvent one specific layer properties not re-usable to tamper the subsequent layer, the latter having complete different properties and disposition. The implementation of at least 2 layers with different techniques/materials increases the anti-tamper security level of a very high extent.

Figure 7:
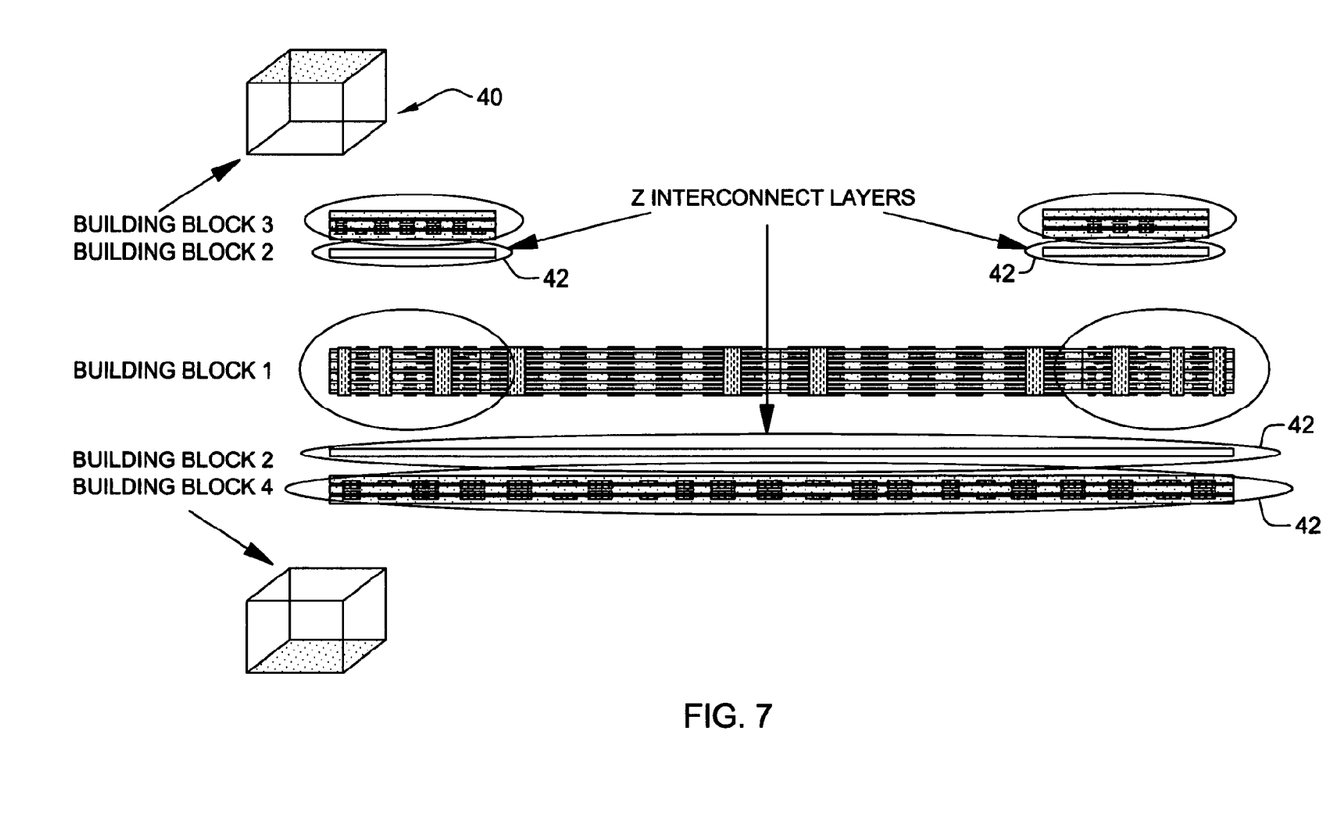
FIG. 7 illustrates, diagrammatically, Z-interconnect layers incorporating a tamper-proofing structure in accordance with various building blocks, such as are illustrated in FIG. 3 of the drawings.
Figure 8:
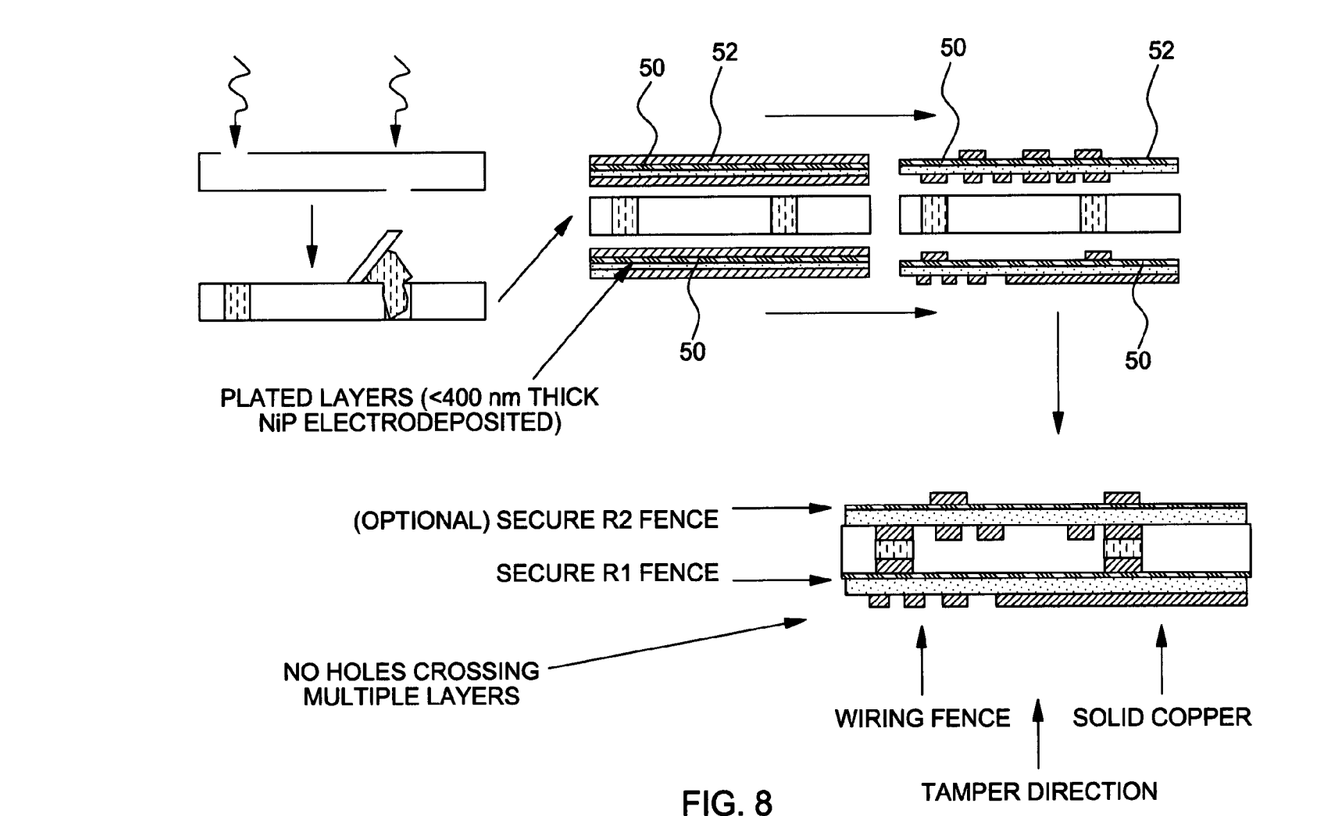
FIG. 8 illustrates, diagrammatically, successive aspects in forming a tamper-proof structure pursuant to a concept of the invention.
Figure 9:
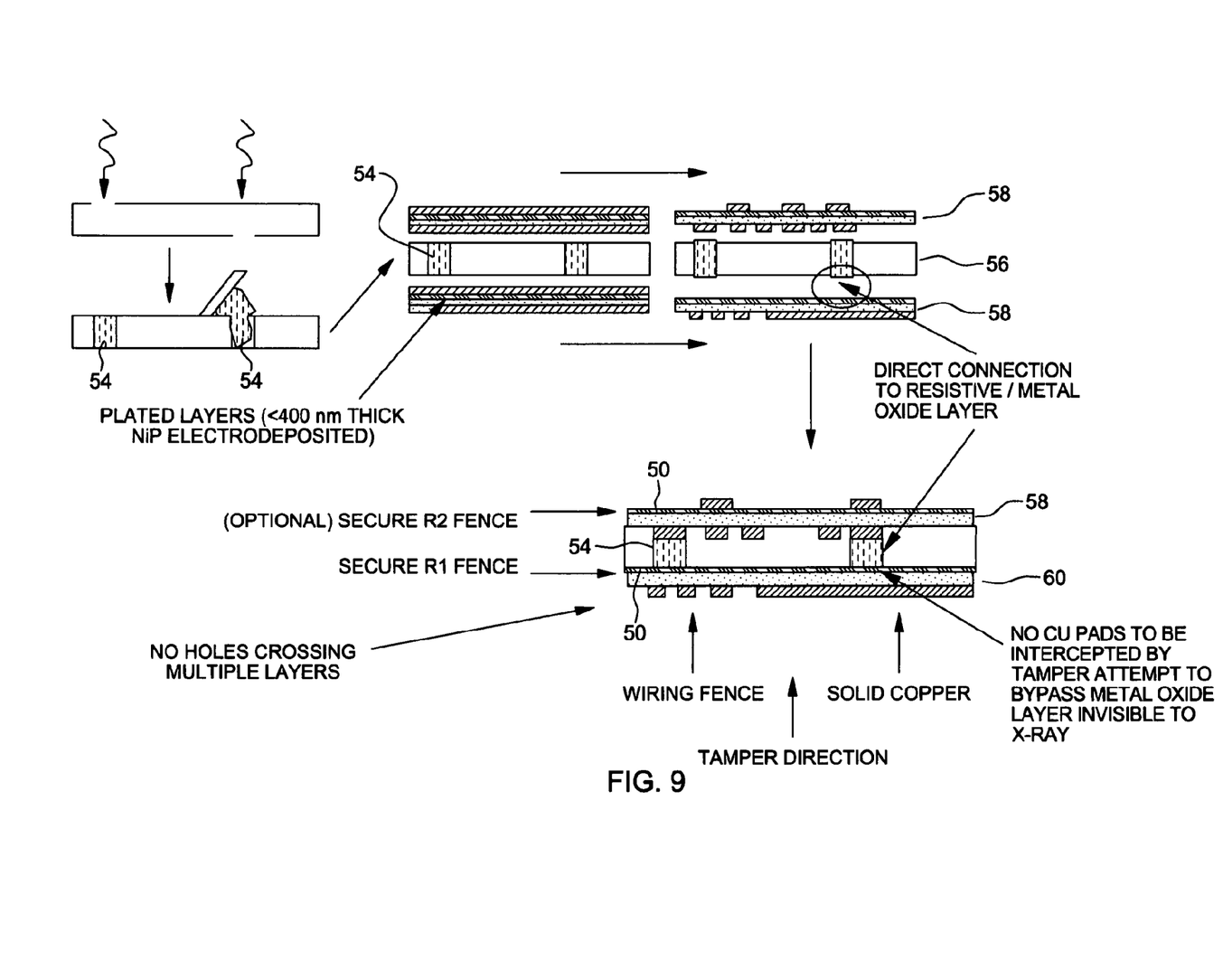
FIG. 9 illustrates a modified approach in comparison with FIG. 8 using Z-interconnect technology approaches in tamper-proofing the circuit structure.

As also shown in the exploded view of diagrammatic FIG. 7 of the drawings, wherein the various building blocks 40 incorporate anti-tampering protection, Z-interconnect layers 42 incorporate layer structure and material providing for protection against tampering, and in this instance, the encircled portions show Z-interconnect layers which bear connecting facing circuit layers by the use of electrically conductive materials, which may have as one of their constituents particles of NiP (nickel phosphorous), Nickel Cromium (NiCr), Copper, Silver, Nickel, Gold, Aluminum, Palladium, and/or other metal alloys or intermetallics particles such, as shown in FIGS. 8 and 9 of the drawings.

Moreover, in a further detailed embodiment, as shown in FIG. 8 of the drawings, layers 50 may incorporate NiP or NiCr film 52, which is patterned into a circuit section belonging to a secure circuit, thereon it can be connected to at least one of various apertures 54, and optional secure fences 56 may also be provided on both the upper and lower surface portions 58, 60 of the multilayered structure, so as to avoid the presence of any holes crossing through the multiple layers. These unplated holes are filled with an electrically conductive material, which may have as one of their constituents particles of NiP (nickel phosphorous), Nickel Cromium (NiCr), Copper, Silver, Nickel, Gold, Aluminum, Palladium, and/or other metal alloys or intermetallics particles, these holes connect the circuit section which resides on one of the layers to another section of a circuit on a different layer, these provide for a wiring fence constituted of either high resistance or low ohmic conductive structures, or a combination of both, that is protective in a direction from which tampering may be expected.

Furthermore, pursuant to FIG. 9, representing a modification of FIG. 8 using the Z-interconnect technology, layers may also be interposed, constituted of NiP or NiCr on dielectrics after copper removal or being directly deposited onto the surface of the dielectrics, and wherein there is provided a direct connection to patterns made of resistive materials. Herein, pursuant to novel aspects thereof, no copper pads are present which can be intercepted by any tamper attempts in order to bypass the metal oxide layer, such structure being invisible to X-rays.

Figure 10:
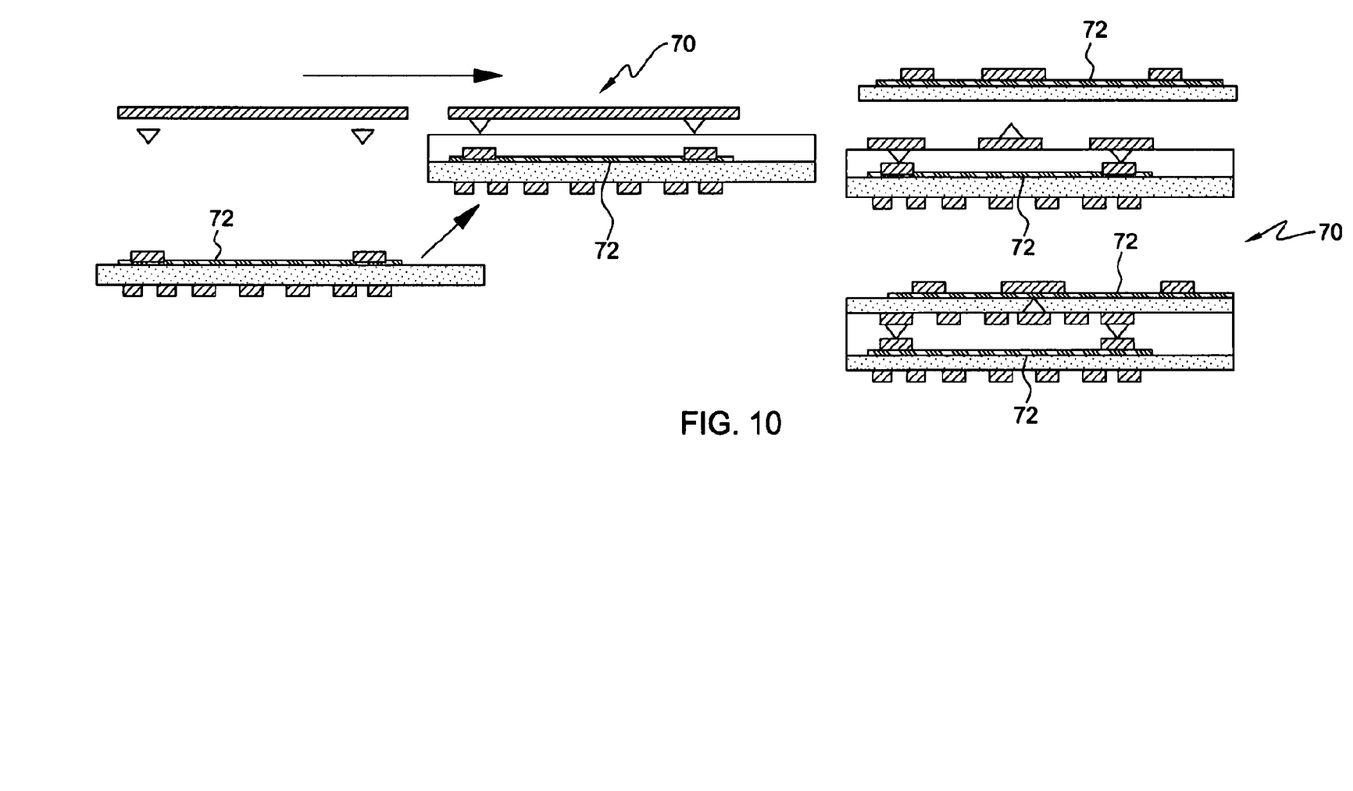
FIG. 10 illustrates, diagrammatically, various aspects in the tamper-proofing structure pursuant to the invention.

Finally, as illustrated in FIG. 10 of the drawings, there is diagrammatically indicated that various embodiments of using preformed polymer or metal-based bumps to interconnect different layers through the mechanical perforation of a single dielectric layer, can be alternatively used in forming the multi-layer structures 70, which is essentially known in the industry, and wherein combination of metallic and resistive materials patterns or circuit segments existing on the layers 72 pursuant to the inventive concept are also utilized to provide for a screening protection against any unauthorized tampering.

While the present invention has been particularly shown and described with respect to preferred embodiments thereof, it will be understood by those skilled in the art that the foregoing and other changes in forms and details may be made without departing from the scope and spirit of the present invention. It is therefore intended that the present invention not be limited to the exact forms and details described and illustrated, but fall within the scope of the appended claims.

The invention claimed is:

1. In a multilayered securing structure for the protection of cryptographic keys and codes contained therein from being compromised by external tampering, a method comprising the steps of:

providing at least one of the layers of said multilayered securing structure with secure network circuits;

contacting said secure network circuits with an electrically conductive material for obstructing tampering attempts to the secure network circuits, wherein the electrically conductive material obstructs tampering by being impervious to x-rays and the electrically conductive material obstructs tampering by destroying cryptographic information within secure cryptographic circuits when the electrically conductive material is damaged; and interfacing said electrically conductive material of said secure network circuits to the secure cryptographic circuits with apertures through said multilayered securing structure filled with a non solderable electrically conductive material, wherein said electrically conductive material comprises an electrically conductive constituent creating embedded resistive patterns distinct from and protective of said secure cryptographic circuits.

2. The method of claim 1, wherein said contacting comprises: superimposing on said secure network circuits a patterned film, and wherein said electrically conductive constituent comprises said patterned film so as to inhibit unauthorized access to said secure network circuits containing internally stored cryptographic keys and codes, said patterned film rendering said circuit impervious to detection by X-rays or microscopy.

3. The method of claim 1 further comprising the step of locating a printed circuit on said at least one layer, and electroplating said patterned film onto said printed circuit for preventing access thereto from an external tampering attempt.

4. The method of claim 1, wherein said patterned film covers at least a portion of the surface of said at least one layer containing the secure network circuits.

5. The method of claim 1, wherein said electrically conductive material for said secure network circuits is arranged on said layer in unpredictable and random patterns that are not detectable through normal external detection techniques utilizing X-rays or microscopy.

6. The method of claim 1, wherein said secure network circuits comprises a metal oxide and/or metal alloys, intermetallics compounds high resistive layer or conductive ink, said protective film consisting of NiP (nickel phosphorous) or Nickel Cromium (NiCr).

7. The method of claim 1, wherein a plurality of said layers are stacked in said structure, each layer having a printed circuit protected by a respective said film; apertures extending through said layers, and said non-solderable electrically conductive material being filled into each said aperture contacting each of said circuits, whereby damage encountered by said apertures responsive to tampering attempts or unauthorized access to the interior of said structure will destroy or erase any cryptographic keys or codes contained in said circuits.

8. The method of claim 7, wherein the non-solderable electrically conductive material in each of said apertures has as one of its constituents particles of NiP (nickel phosphorous), Nickel Cromium (NiCr), Copper, Silver, Nickel, Gold, Aluminum, Palladium, and/or other metal alloys or intermetallics particles.

9. The method of claim 1, wherein said secure network circuits having superimposed protective film thereon are provided on both upper and lower surface portions of said multilayer structure so as to avoid the presence of any holes crossing the layers, and further comprising the step of forming a metal wiring fence having the protective film thereon protected in any direction from which tampering is expected.

10. The method of claim 1, wherein said secure network circuits are constituted of copper, said protective material being a film of NiP or NiCr that is electroplated onto at least one of the surfaces of said copper and left in place even after copper removal.

11. A program storage device readable by machine, tangibly embodying a program of instructions executable by the machine to perform the steps of the method of according to claim 1.

12. In a multi-layered securing structure for the protection of cryptographic keys and codes contained therein from being compromised by external tampering, a system comprising:
   a secure network circuit incorporated in at least one of the layers of said multilayered securing structure;
   protective material contacting said secure network circuit obstructing tampering attempts to the secure network circuits, wherein the protective material obstructs tampering by being impervious to x-rays and the protective material obstructs tampering by destroying cryptographic information within a secure cryptographic circuits when the protective material is damaged; and
   apertures through said multilayered securing structure filled with a non solderable electrically conductive material interfacing said protective material of said secure network circuits with said secure cryptographic circuits, wherein said protective material comprises at least one electrically conductive constituent creating embedded resistive patterns distinct from and protective of said secure cryptographic circuits.

13. In a multilayered securing structure for the protection of cryptographic keys and codes contained therein from being compromised by external tampering, a method comprising the steps of:
   providing at least one of the layers of said multilayered securing structure with secure network circuits, wherein said layers in said multilayered securing structure are stacked and have a printed circuit;
   contacting said secure network circuits with an electrically conductive material for obstructing tampering attempts to the secure network circuit, wherein each layer of the multilayered securing structure including the printed circuit are protected by a film of said electrically conductive material, wherein the electrically conductive material obstructs tampering by being impervious to x-rays and the electrically conductive material obstructs tampering by destroying cryptographic information within a secure cryptographic circuit when the electrically conductive material is damaged; and
   interfacing said electrically conductive material with said secure network circuits through a plurality of randomly arrayed spaced apertures extending through said layers of said multilayered securing structure, and a non-solderable and electrically conductive material being filled into each said aperture contacting each of said secure network circuits, wherein said electrically conductive material consists of an electrically conductive constituent creating embedded resistive patterns distinct from and protective of said secure cryptographic circuits.

* * * * *